(No Model.)
W. BUTTLER.
MANUFACTURE OF GLASS TILE.
No. 372,253. Patented Oct. 25, 1887.
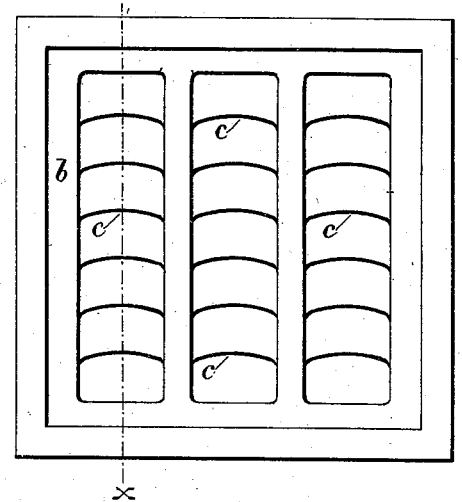
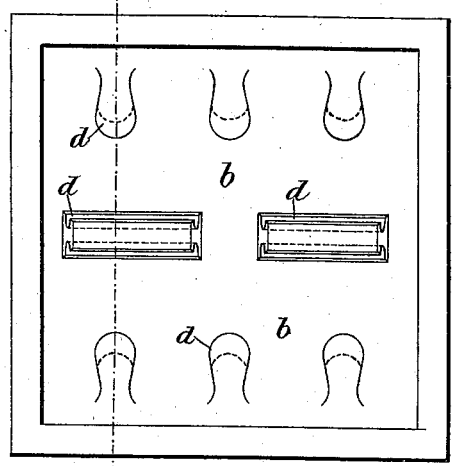
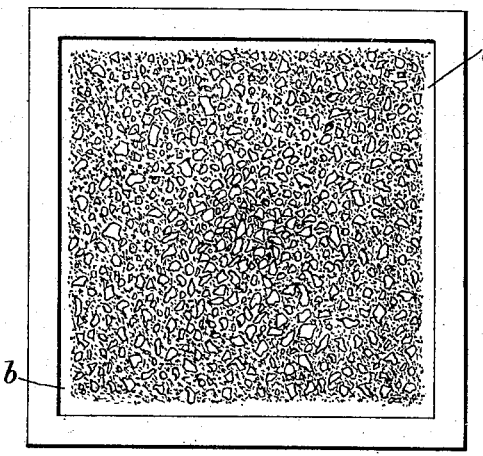
WITNESSES.
H. L. Gill.
W. B. Corwin
INVENTOR.
William Buttler
by his Attorneys
W. Bakewell & Sons

UNITED STATES PATENT OFFICE.

WILLIAM BUTTLER, OF PITTSBURG, PENNSYLVANIA.

MANUFACTURE OF GLASS TILE.

SPECIFICATION forming part of Letters Patent No. 372,253, dated October 25, 1887.

Application filed May 26, 1887. Serial No. 239,397. (No model.)

*To all whom it may concern:*

Be it known that I, WILLIAM BUTTLER, of Pittsburg, in the county of Allegheny and State of Pennsylvania, have invented a new and useful Improvement in the Manufacture of Glass Tile; and I do hereby declare the following to be a full, clear, and exact description thereof.

One of the objections incident to glass tile, which would otherwise be very useful for decorative purposes, is the difficulty in making them adhere properly to the walls and pavements in which they may be set. To make them unite with the mortar, it has been the practice to form the tile with cavities, tongues, projections, &c., in and around which the mortar may lodge; but this plan is defective, because careless workmen often neglect to fit the tiles well in the mortar, and their proper setting necessitates the exercise of considerable care. Besides this, the form of cavities and projections heretofore employed with glass tile has not been well suited for the work on account of the difficulty in forming on glass the proper angular and sunken recesses and the bent or hook-shaped projections.

My invention consists in a method of making glass tile by first pressing the tile and while yet plastic imprinting sunken inclined cavities on its surface, or bending over projections to afford proper holding-surfaces for the mortar, or, when the tile is still plastic, pressing onto its surface sand, pebbles, or the like, to afford a sticking-surface for the mortar.

It also consists in the combination of these steps.

In the accompanying drawings, Figure 1 is a plan view of the back of a glass tile, illustrating the method by which I form the cavities for holding the mortar. Figs. 2 and 3 are plan views of the backs of modified forms of tile. Figs. 4 and 5 are vertical cross-sections on the lines $x\ x$ and $y\ y$ of Figs. 1 and 2. Fig. 6 is a vertical sectional view of the tile, showing how it is backed with cement.

Like symbols of reference indicate like parts in each.

In making my improved glass tile the first step is to press the tile. This is done in any known way in suitable molds, and needs no detailed description. I press it preferably with a slight concavity on the back, as shown at $b$ in Fig. 4. Otherwise the back of the tile may be pressed smooth, or with tongues or knobs projecting at right angles therefrom. As soon as the tile is pressed, and before it has had time to set and harden, either before or after it is taken from the press, I take a metal rod or tool and indent the tile by pressing in it inclined cavities or holes $c$, as shown in Figs. 1 and 4, or by bending over the plastic tongues or knobs to an inclined position, or squeezing in their sides, as shown at $d$ in Figs. 2 and 5. In either case there are formed irregular cavities and ridges or tongues, which afford spaces for the lodgment of the mortar by which the tile is held in its setting. I shall designate the formation of these inclined or irregular spaces or tongues by the generic term "indenting."

The process illustrated in Fig. 3 is substantially the same as that just described. Instead, however, of forming cavities in the tile or bending over tongues to form hooks, I sprinkle over the back of the tile, while still plastic, hot pebbles or gravel, sand, &c., and press this stuff firmly enough against the glass to cause it to stick thereto. In this way I also afford an irregular surface for the mortar to adhere to.

The tile made as described above, and as shown in the first five figures of the drawings, may be, without any further preparation, used for all purposes to which tile are ordinarily put; but, for reasons which I have already explained, I prefer to subject them to further treatment, whereby they are backed with cement or clay before being used. After the tile has been roughened or tongued on the back, it is taken by the workmen and the concavity $b$ is filled up with clay or cement while in a plastic state, and the tile is then set aside until the clay or cement has solidified and hardened. The tongues or rough places at the base of the cavity hold the cement in place, and the tile can now be used without difficulty in the same manner in which ordinary clay tiles are used.

It is not material of what form the concavity $b$ may be. There may be several cavities instead of one, the only essential being that a space shall be afforded which will receive the clay or cement filling.

I claim—

1. An improvement in the manufacture of glass tile, which consists in first pressing the tile of glass and roughening or indenting the back of the tile when it is hot and plastic, substantially as and for the purposes described.

2. An improvement in the manufacture of glass tile, which consists in first pressing the tile of glass with vertical projections on the back of the tile, and then bending over these projections while the tile is hot, whereby the back of the tile is indented, substantially as and for the purposes described.

In testimony whereof I have hereunto set my hand this 11th day of May, A. D. 1887.

WILLIAM BUTTLER.

Witnesses:
   W. B. CORWIN,
   THOMAS W. BAKEWELL.